(12) United States Patent
Evenson et al.

(10) Patent No.: US 10,438,173 B2
(45) Date of Patent: Oct. 8, 2019

(54) MANAGEMENT OF ENVIRONMENTALLY SENSITIVE ITEM DISPOSITION

(71) Applicant: Target Brands, Inc., Minneapolis, MN (US)

(72) Inventors: Amy D. Evenson, Brooklyn Center, MN (US); Venkata Nandakishore Kandikonda, Woodbury, MN (US); Heidi K. Dwinnell, Mounds View, MN (US); Corey M. Eikam, Farmington, MN (US); Brooke R. Klecker, Shakopee, MN (US); Kim M. Makal, Rogers, MN (US); Bruce A. Schreifels, Coon Rapids, MN (US)

(73) Assignee: Target Brands, Inc., Minneapolis, MN (US)

(*) Notice: Subject to any disclaimer, the term of this patent is extended or adjusted under 35 U.S.C. 154(b) by 874 days.

(21) Appl. No.: 14/109,344

(22) Filed: Dec. 17, 2013

(65) Prior Publication Data

US 2015/0170111 A1    Jun. 18, 2015

(51) Int. Cl.
 *G06Q 10/00* (2012.01)
 *G06Q 50/26* (2012.01)

(52) U.S. Cl.
 CPC ............ *G06Q 10/30* (2013.01); *G06Q 50/26* (2013.01); *Y02W 90/20* (2015.05)

(58) Field of Classification Search
 CPC .................................................. Y02W 90/20
 See application file for complete search history.

(56) References Cited

U.S. PATENT DOCUMENTS

| | | |
|---|---|---|
| 7,080,777 B2 | 7/2006 | Wagner et al. |
| 7,366,640 B2 | 4/2008 | Smith et al. |
| 7,501,951 B2 | 3/2009 | Maruca et al. |
| 7,681,792 B2 | 3/2010 | Wagner et al. |
| 7,761,331 B2 | 7/2010 | Low et al. |
| 8,204,620 B2 | 6/2012 | Mallett et al. |
| 8,396,755 B2 | 3/2013 | Bonner et al. |
| 2004/0148052 A1 | 7/2004 | Ferguson et al. |
| 2005/0228682 A1 | 10/2005 | Firestone, III |
| 2005/0261917 A1 | 11/2005 | Forget Shield |

(Continued)

FOREIGN PATENT DOCUMENTS

| | | |
|---|---|---|
| WO | 2011035277 A1 | 3/2011 |
| WO | 2012069839 A1 | 5/2012 |

OTHER PUBLICATIONS

Texas Commission on Environmental Quality RG-235 (Rev. Jul. 2009).*

(Continued)

*Primary Examiner* — Julie M Shanker
(74) *Attorney, Agent, or Firm* — Shumaker & Sieffert, P.A.

(57) ABSTRACT

A system manages handling and disposition of environmentally sensitive items. The disposition management system presents one or more environmentally sensitive questions indicative of the condition of an environmentally sensitive item, the disposition of which is to be managed and tracked. Based on answers to the environmentally sensitive questions, the system determines a disposition procedure for the item and generates a disposition label uniquely identifying the item so that it may be tracked from its entry into the waste stream to its disposition with an outbound disposition provider.

8 Claims, 12 Drawing Sheets

(56) References Cited

U.S. PATENT DOCUMENTS

| | | | | |
|---|---|---|---|---|
| 2008/0061977 | A1* | 3/2008 | Maruca | B65F 1/1484 340/572.1 |
| 2008/0190953 | A1* | 8/2008 | Mallett | A61L 11/00 221/13 |
| 2013/0282597 | A1* | 10/2013 | Martin | G06Q 10/30 705/308 |
| 2013/0325727 | A1* | 12/2013 | MacDonell | G06Q 10/30 705/308 |

OTHER PUBLICATIONS

Office Action from Canadian Patent Application No. 2,843,087, dated May 13, 2014 (3 pages).
Office Action from Canadian Patent Application No. 2,843,087, dated Jan. 8, 2015 (4 pages).
IBM Warehouse Management Systems Concepts Guide, IBM Corporation, Release 9.1, 115 pp., 1999.
Wolff et al., "Discarding a Square Peg into a Round Hole: Challenges of Creating a Retail Hazardous Waste Management Program," Natural Resources & Environment, vol. 26, No. 4, Spring 2012, 5 pp.
Office Action from Canadian Patent Application No. 2,843,087, dated Sep. 9, 2014 (2 pages).

* cited by examiner

MANAGEMENT OF ENVIRONMENTALLY SENSITIVE ITEM DISPOSITION

TECHNICAL FIELD

The disclosure relates to managing the disposition of environmentally sensitive items.

BACKGROUND

Hazardous waste is waste that is dangerous or potentially harmful to human health or the environment. Hazardous wastes may include liquids, solids, or contained gases. All generators, transporters, treaters, storers, and disposers of hazardous waste are required to provide information about their hazardous waste activities to state environmental agencies, which is then transmitted to the U.S. Environmental Protection Agency (EPA). In a retail setting, certain products may be hazardous to the environment and to human health if they are disposed of improperly, and may therefore fall under the definition of "hazardous waste." Such products may include, for example, cleaning products, fertilizers, pesticides, batteries, personal care products, hair dyes, motor oil, paint, and many other products sold in a retail setting. To comply with EPA requirements, proper handling, disposition, and reporting procedures must be followed to avoid the risk of civil and criminal penalties.

SUMMARY

This disclosure is directed to techniques for managing disposition of environmentally sensitive items.

In one example, the disclosure is directed to a system comprising an environmentally sensitive item management module, executable on one or more processors, configured to receive product identification information associated with an environmentally sensitive item and configured to cause to be presented, on a user interface and based on the product identification information, one or more environmentally sensitive questions indicative of the condition of environmentally sensitive item, the environmentally sensitive item management module further configured to receive user input indicative of answers to the one or more environmentally sensitive questions, and to determine, based on the answers to the environmentally sensitive questions, to generate a disposition identifier uniquely associated with the environmentally sensitive item, and a printer configured to print a disposition label that includes the disposition identifier uniquely associated with the environmentally sensitive item. The s environmentally sensitive item management module may be further configured to associate the environmentally sensitive item with one of a plurality of disposition categories based on the received product identification information and the answers to the environmentally sensitive questions.

In another example, the disclosure is directed to a method comprising receiving, by a computing system, product identification information associated with an environmentally sensitive item sold in a retail store, presenting, on a user interface and based on the product identification information, one or more environmentally sensitive questions indicative of the condition of the environmentally sensitive item, receiving user input indicative of answers to the one or more environmentally sensitive questions, associating the environmentally sensitive item with one of a plurality of disposition categories based on the received product information and the answers to the environmentally sensitive questions, generating a unique disposition identifier associated with the environmentally sensitive item, and printing a disposition label that includes the unique disposition identifier associated with the environmentally sensitive item.

In another example, the disclosure is directed to a system comprising a point-of-sale computing device configured to receive product identification information, a disposition management computing device configured to receive the product identification information and present, on the point-of-sale computing device and based on the product identification information, one or more environmentally sensitive questions indicative of whether the product is an environmentally sensitive item, the point-of-sale computing device further configured to receive user input indicative of answers to the one or more environmentally sensitive questions, the disposition management computing device further including a disposition module, executed by the disposition management computing device, configured to determine, based on the answers to the environmentally sensitive questions, whether the product is an environmentally sensitive item and to associate the environmentally sensitive item with one of a plurality of categories based on the received product identification information and the answers to the environmentally sensitive questions, and to generate a unique disposition identifier associated with the environmentally sensitive item, the point-of-sale computing device further configured to print a disposition label that includes the unique disposition identifier, and a plurality of bins, wherein each of the plurality of bins is associated with at least one of the plurality of categories, and wherein each of the plurality of bins is associated with unique bin identification information, each bin further including a bin label printed with the associated unique bin identification information.

The details of one or more examples are set forth in the accompanying drawings and the description below. Other features and advantages of the disclosure will be apparent from the description and drawings, and from the claims.

DETAILED DESCRIPTION

Generally, aspects of the disclosure are directed to techniques for managing the handling and disposition of hazardous materials or other environmentally sensitive items, defective items, items to be donated, and the like.

Many commercial chemical products are regulated as "hazardous waste" when discarded by retailers even though these same products would not be so regulated when discarded by individual consumers. At times a retailer may need to dispose of such items, such as when an item is broken or damaged on the sales floor or when a consumer wants to return or exchange an item. Accordingly, retailers are left to determine (and train their employees on how to determine) when an item should be disposed of, whether a particular item should be identified as "hazardous waste," and the proper techniques for the handling and disposition of such hazardous waste.

Figure 1:
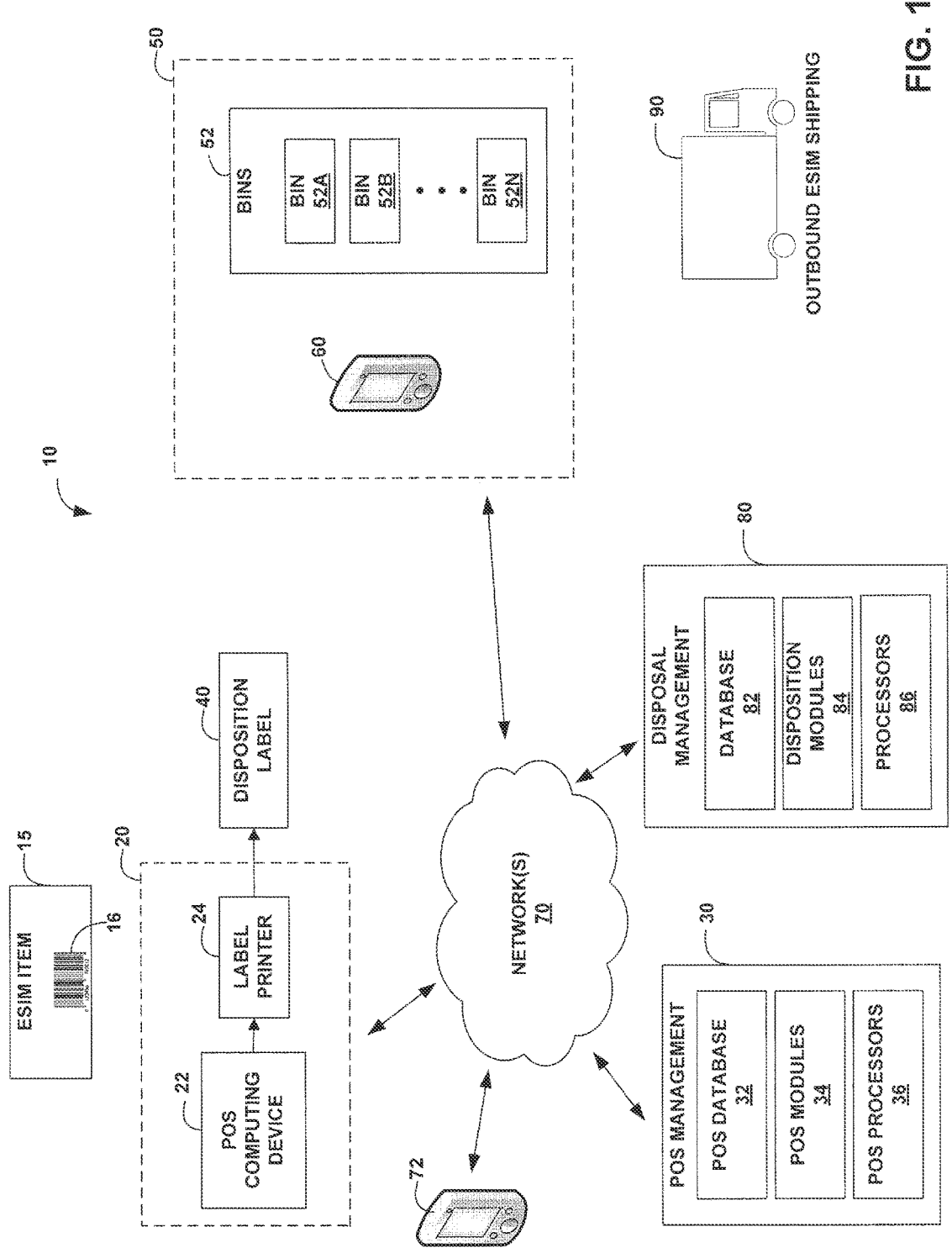
FIG. 1 is a block diagram illustrating an example retail setting 10 in which disposition of environmentally sensitive items is managed according to one or more aspects of the present disclosure.

FIG. 1 is a block diagram illustrating an example retail setting 10 in which disposition of "environmentally sensitive items" (herein referred to as ESIM items) are managed. The term "environmentally sensitive item" may include "hazardous waste" as defined by federal, state, and/or local regulations. The term "environmentally sensitive items" may also include items that do not fall under a definition of "hazardous waste" but that are nonetheless subject to defined handling and disposition procedures, whether those procedures are defined by government regulation, by some other regulatory body, by the retailer or by some other entity.

For purposes of illustration, the disposition management techniques are described herein with respect to a retail setting. However, it shall be understood that the disposition management techniques described herein may be used or adapted for use in other settings, such as manufacturing, hospitality, warehouse management, healthcare, business, academic, or other setting in which disposition of environmentally sensitive items is to be managed.

The example retail setting 10 of FIG. 1 includes several components for managing disposition of an ESIM item 15. These components include one or more point-of-sale (POS) computing device 20, a POS management system 30, a disposition label printer 24, and a disposition bin management system 50. One or more mobile devices 72, such as a mobile phone, personal digital assistant (PDA), tablet computer, etc., may also be included. Each of these components may communicate with each other using one or more computer network(s) 70. Network(s) 70 may include, for example, one or more of a dial-up connection, a local area network (LAN), a wide area network (WAN), the internet, a cell phone network, satellite communication, or other means of electronic communication. The communication may be wired or wireless. Each ESIM item 15 is identified, and its proper handling and storage procedures are managed and tracked, until it is disposition with an outbound environmental services provider 90.

An ESIM item 15 may enter the ESIM stream through several different entry points. For example, an ESIM item may enter the ESIM stream when a customer brings a previously purchased item back into a store for return or exchange. In another example, an ESIM item may enter the ESIM stream when an item is broken or damaged on the sales floor or at some other location in the store. The following description will use the customer return example for purposes of the present description; however, it shall be understood that items may enter the ESIM stream through any of a number of other means, and that the disclosure is not limited in this respect.

In the example of FIG. 1, a previously purchased item 15 is brought to the store by a customer, either for return or exchange. POS computing device 20 provides the interface for transactions with the customer. POS computing device 20 is essentially a computerized cash register designed to electronically process retail transactions. As such, an example POS computing device 20 typically includes a computing device 22 including one or more processors and POS application software that provides the ability to look up and process product information, record and track customer orders, process credit and debit cards, and many other functions required by a retailer. In some examples, POS computing device 20 may include additional hardware such as a monitor, a cash drawer, a conveyor belt, a receipt printer, a customer display, a barcode scanner, a debit/credit card reader, and the like. In other examples, a POS computing device 20 may be implemented using mobile phones or tablet computers.

One or more POS computing devices 20 may interface with a POS management system 30. POS management system 30 includes a POS database 32 and POS applications that permit system 30 to store data such as sales, inventory, and customer data, and to handle functions such as inventory control, purchasing, receiving, data analysis, report generation, etc. Users may access sales data and generate reports using remote computing devices 72, such as laptop or desktop computers, mobile phones, tablet computers and the like.

The one or more POS computing devices 20 may also interface with disposition management system 80. Disposition management system 80 includes, for example, a database 82 and disposition modules 84 that permit system 80 to determine whether an item should be identified as an ESIM item in accordance with one or more aspects of the present disclosure. Disposition module 84 further permits system 80 to present one or more environmentally sensitive questions designed to identify the condition of an ESIM item, and to identify the proper handling and disposition procedures for a particular item.

POS database 32 and database 82 may include, e.g., standard or proprietary electronic databases or other data storage and retrieval mechanisms. In one example, databases 32, 82 may include one or more databases, such as relational databases, multi-dimensional databases, hierarchical databases, object-oriented databases, or one or more other types of databases. Databases 32, 82 may be implemented in any non-transitory computer readable medium, including software, hardware, and combinations of both. In one example, databases 32, 82 may include proprietary database software stored on one or a variety of storage mediums on a data storage server connected to network 70 and configured to store information associated with products and/or services available for purchase from a retailer. Storage media included in or employed in cooperation with databases 32, 82 may include, e.g., any volatile, non-volatile, magnetic, optical, or electrical media, such as random access memory (RAM), read-only memory (ROM), nonvolatile RAM (NVRAM), electrically-erasable programmable ROM (EEPROM), flash memory, or any other digital media.

Databases 32, 82 may store information associated with products offered by a retailer. As one example, POS database 32 may store information associated with such products, such as product price information, product identification information, product description information, promotional and/or discount information, past sales information, customer information, tax information, and the like. POS computing device 20 may periodically retrieve product and/or service information from POS database 32, such as during a checkout procedure at a retail store.

As another example, database 82 may store information associated with products offered for sale by the retailer concerning whether or not each item is an ESIM item, and if so, proper handling and disposition techniques associated with the item. For example, database 82 may store information concerning whether or not an item is an ESIM item, disposition category information for the item, environmentally sensitive question information associated the item, proper handling information for the item, proper disposition information for the item, tracking information for the item, etc.

As discussed above, items may enter the retailer's waste stream from any of a number of entry points, such as when an item is broken or damaged on the sales floor or when a customer desires to make a return or exchange. Most items in a retail setting include a Universal Product Code (UPC) barcode 16 or other type of electronically readable product identification. In the case of a customer return/exchange, the UPC 16 of the item is scanned at POS computing device 20. UPC 16 generally indicates both the manufacturer and the specific product to which the UPC is attached. When the code is scanned, the POS computing device 20 may communicate with POS management system 30 to determine, for example, the current price of the item stored in POS database 32.

POS computing device 20 may also communicate with disposition management system 80 to determine whether the item should be identified as an ESIM item. For example, in response to receiving a request from a POS computing device 20, disposition management system may cause one or more environmentally sensitive questions to be displayed at POS computing device 20. A user inputs an answer to each environmentally sensitive question at POS computing device 20. The purpose of the environmentally sensitive questions is to determine the condition of the ESIM item and the proper handling and disposition procedures corresponding to that type or category of ESIM item and the condition of the ESIM item. Examples of environmentally sensitive questions may include, for example, a question concerning whether the item packaging is compromised (e.g., "Does the item have a missing nozzle, a broken cap, or is it leaking or partially full?"); whether the item is broken (e.g., "Is the item broken?"); whether the item is unsafe for use (e.g., "Does the item have a wet or frayed electrical cord?" or "Is the item broken with sharp pieces?"); whether the package has been opened (e.g., "Has the packaging been opened?"); and/or other questions designed to understand the condition of the item.

Other environmentally sensitive questions may also be employed depending upon the environment in which the disposition management techniques are used (e.g., retail, healthcare, warehouse, hospitality, etc.).

Disposition management system 80 may, based on the product identification information determine the disposition category corresponding to the item 15. Example disposition categories may include, corrosive acidic, corrosive basic, flammable, oxidizer, state regulated, problem item/recall, electronics recycling, light bulb recycling, universal, pharmaceuticals, battery, liquor, or other disposition category appropriate to the application.

For example, disposition management system 80 may store the associated disposition category of an item associated with the product identification information. Disposition management system 80 communicates the disposition category to POS computing device 20. Upon receipt of the disposition category, POS computing device 20 generates a disposition label 40 uniquely corresponding to the item 15. Disposition label 40 may include the name of the product, an item description, a disposition graphic indicative of the disposition category, and a unique identifier assigned to the item. The unique identifier may include a barcode, a tracking number, and/or other identifier that uniquely identifies the item. In this way, each item is associated with a unique identifier. The unique identifier allows each item to be tracked through the disposition management chain until its final disposition. The unique identifier further allows tracking and reporting procedures to be followed for each identified ESIM item.

Disposition bin management system 50 includes a check-in/out device 60 and one or more bins 52A-52N. In this example, each bin 52A-52N is associated with a different category of ESIM item. Example disposition categories may include the following: corrosive acidic, corrosive basic, flammable, oxidizer, state regulated, problem item/recall, electronics recycling, light bulb recycling, universal, or other disposition category appropriate to the application. A check-in/out device 60 allows each item to be scanned in to the appropriate bin. For example, check-in/out device 60 may include a barcode scanner that scans disposition label 40 and then scans a bin label on the corresponding disposition bin 52A-52N (bin labels not shown in FIG. 1). This action essentially "checks-in" the uniquely identified item 15 into the appropriate disposition bin 52 for tracking and storage purposes. If the category for the scanned disposition label 40 matches the category of the scanned disposition bin 52, disposition management system 80 associates the unique identifier for the item with the scanned disposition bin 52 in database 82. In the event that the category for the scanned disposition label does not match the category of the scanned disposition bin 52, an error message may be generated and displayed on check-in/out device 60, thus alerting the user that the item 15 does not belong in the scanned disposition bin 52. The error message may further indicate the proper disposition bin 52 to which the item 15 belongs, request that the item be rescanned into a different disposition bin 52, or other appropriate follow-up procedures.

The ESIM items 15 are further tracked when leaving the store from the disposition bins 52A-52N. For example, bins 52-A-52B may be "checked-out" to an outbound disposition provider 90. In the example of FIG. 1, outbound disposition provider 90 includes an approved disposition provider that picks up ESIM items from the retailer and is charged with their proper disposition. Retailers may have ESIM pick-ups scheduled at periodic intervals or on demand. When processing a pick-up, check-in/out device 60 may scan each bin label on each disposition bin 52A-52N at the time of pick-up by ESIM shipping provider 90. This action essentially "checks-out" each item in the scanned disposition bins 52A-52N to its disposition with the ESIM shipping provider, at which point the retailers responsibility for the ESIM items in those bins is complete. Data concerning the disposition bin, the unique identifier associated with each ESIM item in each of the bins, the date of check-out, and data concerning the ESIM disposition provider, as well as any other associated data, may be stored in ESIM database 82 for tracking and reporting purposes.

Users may access ESIM data and generate reports remotely via user computing devices 72. User computing devices 72 may include, for example, laptop or desktop computers, mobile phones, table computers and the like. User computing devices 72 may include, for example, software applications and/or smartphone apps that allow users to generate and view real-time sales and/or ESIM data and reports. Such ESIM reports may provide the retailer with an efficient mechanism for managing the handling, tracking, and disposition of ESIM items, as well as for generating reports required to comply with federal, state, and local regulations for the disposition of environmentally sensitive items. The disposition management techniques described herein may therefore help minimize long-term liability, complement an organization's so-called "green goals", and/or minimize costs associated with management of environmentally sensitive item disposition.

Figure 2:
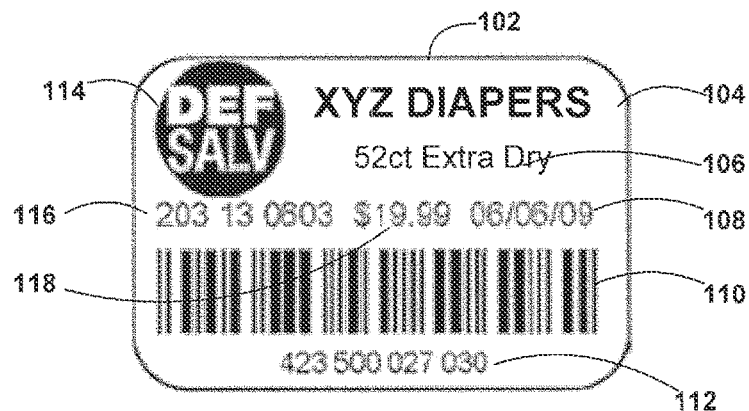
FIG. 2 shows an example disposition label.

FIG. 2 shows an example disposition label 102. Example disposition label 102 includes the name 104 of the product ("XYZ Diapers"), an item description 106 that includes a more detailed description of the product ("52 count Extra Dry"), a disposition graphic 114 that is indicative of the disposition category ("Def Salv" representing the category "Defective/Salvage"), a date 108 that the disposition label was generated, a retailer department/product identification number 116, an item price 118, a unique disposition barcode 110 assigned to the item, and a unique disposition identifier 112 assigned to the item. Although in this example the unique identifier includes a barcode 110 and corresponding identification number 112, it shall be understood that the unique identifier may include a barcode, a QR code, or other electronically readable label. The unique identifier may further include an identification number, name, and/or other identifier that uniquely identifies the item. The unique identifier allows each item to be tracked through the disposition management chain until its final disposition. The unique identifier further allows ESIM tracking and reporting procedures to be followed for each identified ESIM item.

Figure 3:
FIG. 3 shows another example disposition label.

FIG. 3 shows another example disposition label 122. Example disposition label 122 includes the name 124 of the product ("ABC Bleach"), an item description 126 ("Fresh Scent 96 ounce"), a disposition graphic 134 indicative of the disposition category ("CB" representing the category "Corrosive Basic"), a date 128 that the disposition label was generated, a retailer department/product identification number 136, a unique disposition barcode 130 and a unique disposition identifier 138. Label 122 further includes a store number where the item was marked out of stock or defected.

A disposition label need not include all of the example information shown with respect to labels 102 and 122. In addition, other information may also be shown on the disposition label depending upon the needs of the retailer, the product, the disposition category, or other relevant factor. It shall therefore be understood that the disposition labels shown and described herein are for example purposes only, and the disclosure is not limited in this respect.

Figure 4:
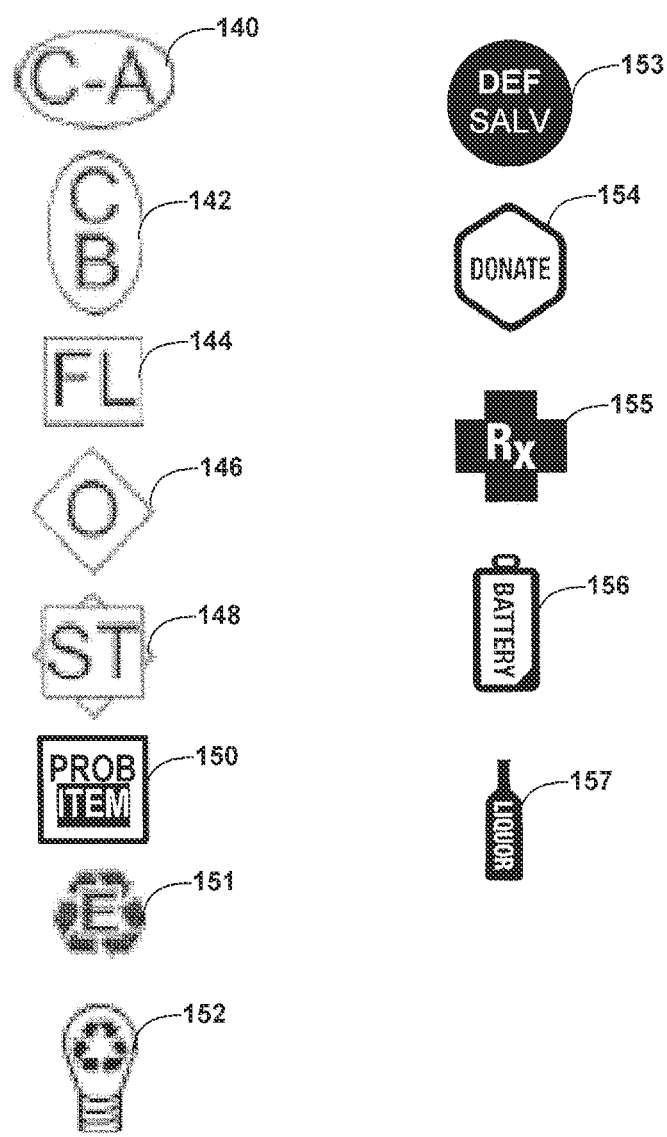
FIG. 4 shows example disposition graphics which may be used to designate a disposition category on a disposition label.

FIG. 4 shows example disposition graphics 140-158 which may be used to designate a disposition category on a disposition label. These include corrosive acidic graphic 140, corrosive basic graphic 142, flammable graphic 144, oxidizer graphic 146, state regulated graphic 148, problem item/recall graphic 150, electronics recycling graphic 151, light bulb recycling graphic 152, defective/salvage graphic 153, donation graphic 154, universal waste pharmaceuticals graphic 155, universal waste battery graphic 156, and liquor graphic 157. Many other disposition graphics may also be used, and it shall be understood that the disclosure is not limited in this respect.

Figure 5:
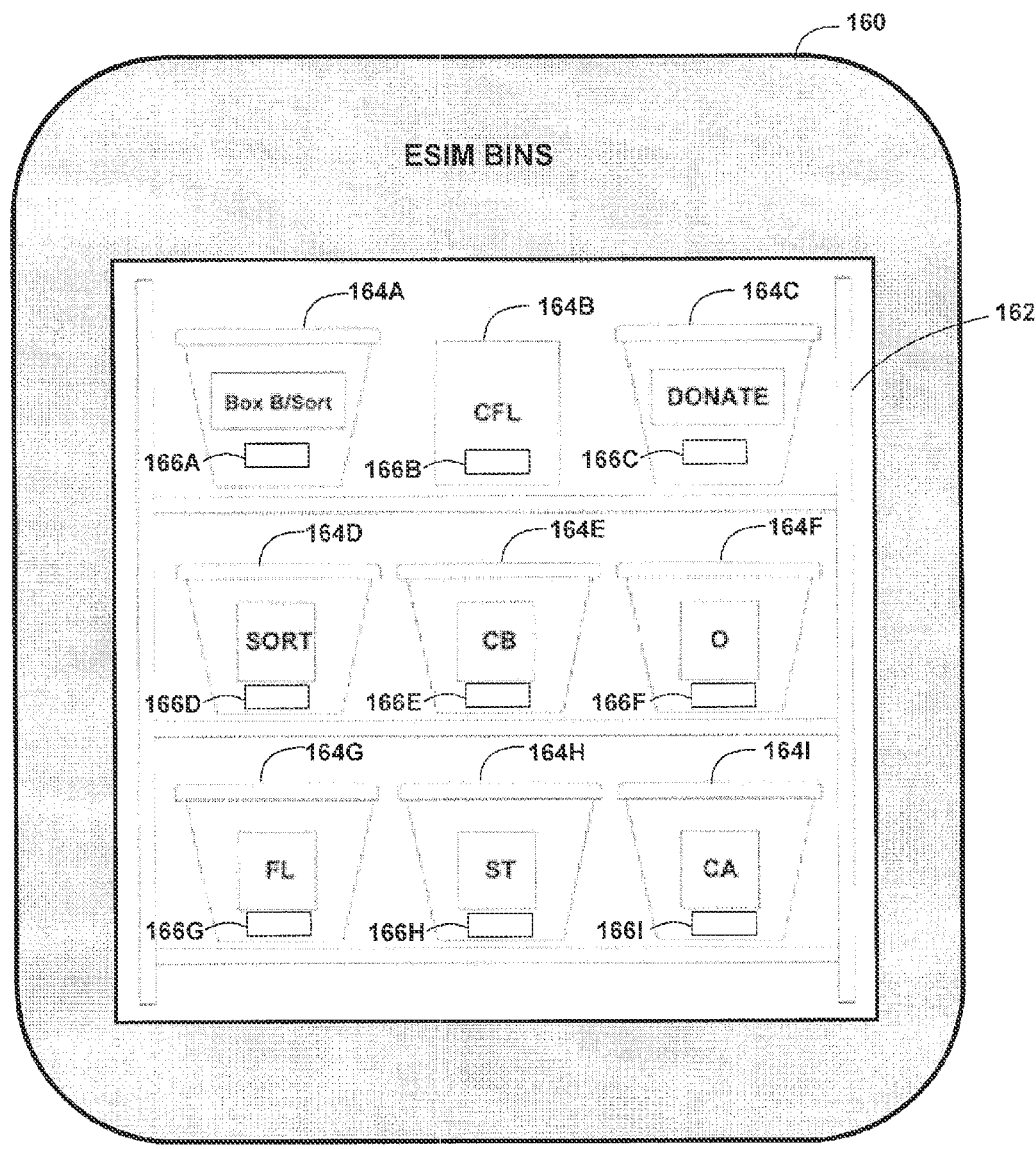
FIG. 5 shows an example disposition bin set up for use with disposition management procedures of one or more aspects of the present disclosure.

FIG. 5 shows an example disposition bin set up 160 such as may be utilized with the disposition management procedures of one or more aspects of the present disclosure. A plurality of disposition bins 164 may be disposed on a shelf 162 or other reverse logistics receiving area. In this example, bins 160 include a Box B/Sort bin 164A, a Donate bin 164C, and a Sort bin 164D. Bins 160 further include one or more disposition bins, such as CFL bin 164B associated with a disposition category "Compact Fluorescent," CB bin 164E associated with a disposition category "Corrosive Basic," O bin 164F associated with a disposition category "Oxidizer," FL bin 164G associated with a disposition category "Flammable," ST bin 164H associated with a disposition category "State Regulated," and CA bin 164I associated with a disposition category "Corrosive Acidic." It shall be understood that other bins may also be used and that the disclosure is not limited in this respect.

Each of example bins 164A-164I further includes a bin id label 166A-166I, respectively. Each bin id label 164 may include, for example, a unique bin barcode or other electronically-readable label that uniquely identifies the bin, and a human readable representation of the barcode (i.e., a number). Each bin id label 164 may also include a category identifier that identifies the disposition category of the items associated with the bin (e.g., Sort, Salvage, Donate, ESIM, etc.). Bin id labels 166A-166I may further include a graphic indicative of the category of the items in the bin (such as those shown in FIG. 4, for example), a text description of the category associated with the bin, and any other bin identification/descriptive information.

FIGS. 6A-6E show example screen displays that may be presented on a first computing device, such as POS computing device 20, during a customer return/exchange transaction. Screen displays shown in FIGS. 6A-6E may include one or more icons or other graphical elements that permit a user to interact with disposition management system 80 and/or execute various operations or functionalities associated disposition management system 80. For example, icons displayed on POS computing device may include textual objects (e.g., displayed text or pictures) graphical elements (e.g., a slider, a progress bar, buttons, text entry boxes, etc.) or other graphical or text-based interface elements.

Upon receipt of the item identification information, disposition management system 30 determines, based on information contained in database 82, whether the scanned item is an ESIM item. Database 82 may contain a variety of information concerning items sold by the retailer, including whether a particular item is an ESIM item. For those ESIM items, disposition management system 80 may provide a systematic procedure to determine the condition of the ESIM item and identify the proper handling and disposition procedures for that item. For items that are not ESIM items, or are not otherwise defective, subject to donation etc., disposition management system 80 may permit the return/exchange transaction to occur without requiring ESIM handling or disposition procedures, or may proceed to a donate or defective/salvage procedure.

Figure 6A:
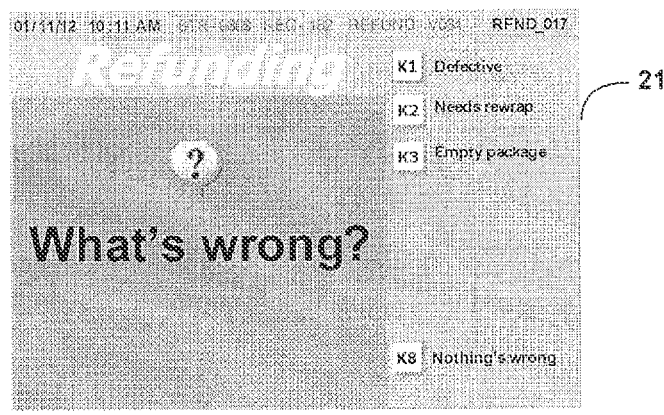
FIGS. 6A-6E show example screen displays that may be presented on a first computing device, such as POS computing device 20, during a customer return/exchange transaction.

For example, after a user has scanned the item and indicated a return, example screen 210 of FIG. 6A may be displayed. If the item is defective, the user may select K1 ("Defective") to tell the system that the item is defective. In some examples, this screen may not displayed if the item has been set as "autodefective," meaning that the item will always be defected upon return, regardless of condition. The autodefective status may be used for items that the retailer may not want to resell, such as baby formula or food.

Figure 6B:
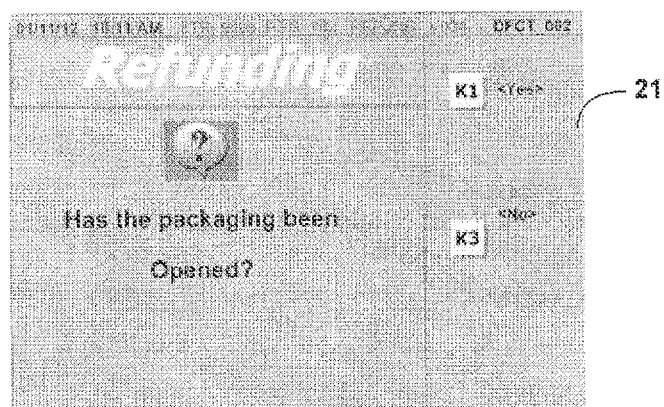
Figure 6C:
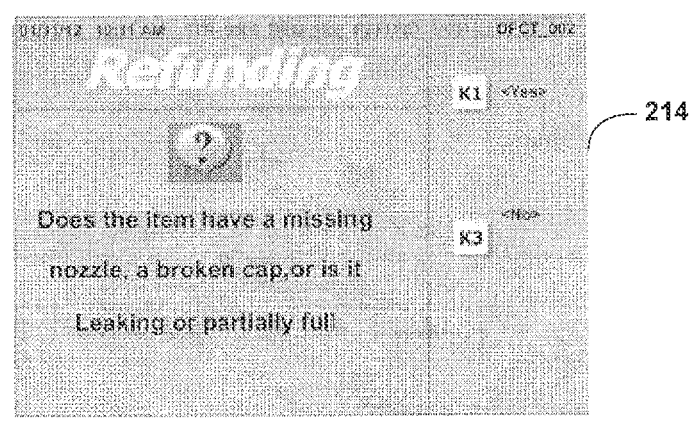
Figure 6D:
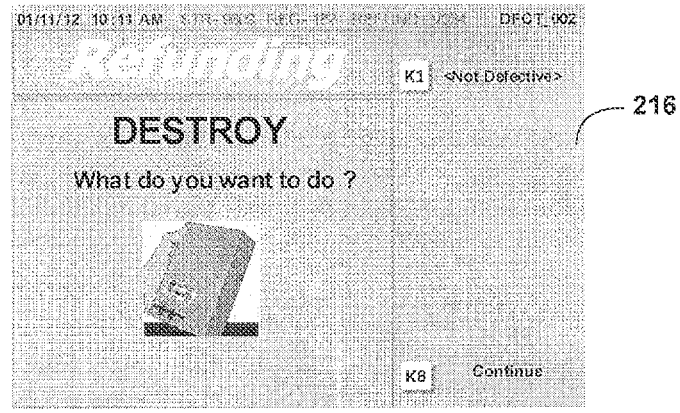

If the item is an ESIM item, then one or more environmentally sensitive questions may be displayed to determine the condition of the ESIM item, such as shown on example screen display 212 of FIG. 6B ("Has the packaging been Opened?") or example screen display 214 of FIG. 6C ("Does the item have a missing nozzle, a broken cap, or is it Leaking or partially full?"). The one or more environmentally sensitive questions may be chosen based on the disposition category for the item. The user enters the answers to the one or more environmentally sensitive questions, and the answers are received by disposition management system 80.

The system determines the disposition of the item based on the disposition category and the answers to the one or more environmentally sensitive questions. The system may also display the final disposition of the item on POS computing device 20. For example, assuming that the user answers the one or more environmentally sensitive questions to the positive (e.g., yes, the packaging has been opened), a screen such as example screen display 216 of FIG. 6D may appear with the "Destroy" disposition. The user has the option to state that the item is not defective (using K1) or to continue (using K2).

Figure 6E:
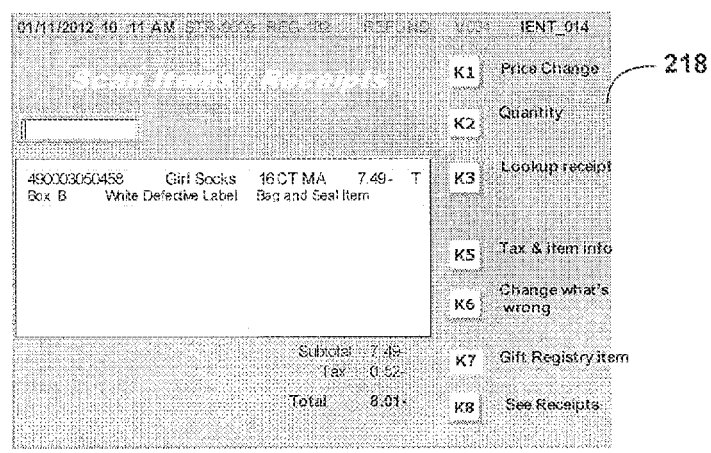

The system may next present a screen such as example screen display 618 shown in FIG. 6E. Screen display 618 instructs the user to apply the disposition label to the item and place it in a designated holding area to wait for additional processing. The designated holding area may be considered temporary. At least once a day, the items from the designated holding area may be brought to bins 50 for sorting/tracking.

Figure 7A:
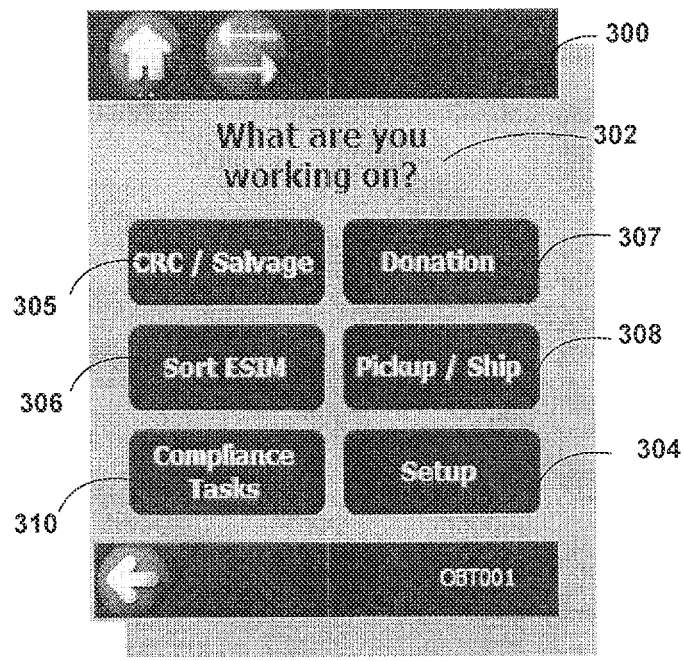
FIGS. 7A and 7B show example screen displays that may be presented by a disposition management system in accordance with one or more aspects of the present disclosure.
Figure 7B:
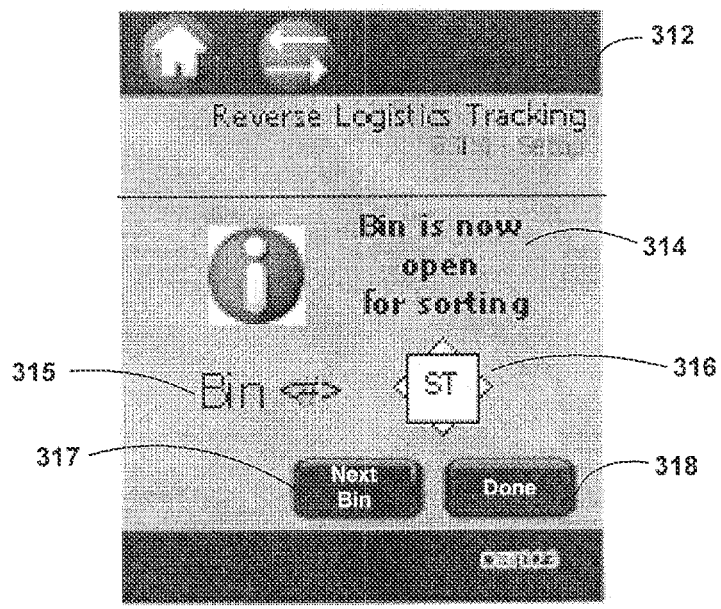

FIGS. 7A and 7B show example screen displays 300, 312, that may be presented by a disposition management system in accordance with one or more aspects of the present disclosure. Example screen displays 300, 312 may be presented on a computing device, such as check-in/out device 60. Screen display 300 may include one or more graphical elements, such as text display 302 and touch screen buttons 304 ("Setup"), 305 ("CRC/Salvage"), 306 ("Sort ESIM"), 307 ("Donation"), 308 ("Pickup/Ship"), and 310 ("Compliance Tasks") that permit a user to interact with disposition management system 80 and carry out one or more corresponding functions of the disposition management system. For example, touching of graphical element 304 ("Setup"), as indicated in FIG. 7A, may permit a user to invoke a bin setup procedure. As part of the bin setup procedure, disposition management system may cause a screen display, such as screen display 312 of FIG. 7B, to be displayed on check in/out device 60. Example screen display 312 includes graphical elements through which a user may set up one or more disposition bins in a reverse logistics staging area. This is a confirmation screen that tells the team member that the bin is ready for sorting, the bin ID, and the disposition category that has been assigned.

A text display 314 indicates "Bin is now open for sorting." Graphical element 315 indicates that the user may scan/enter the unique bin id. Graphical element 316 indicates the category for the scanned bin. The user may then choose to setup another bin by selecting graphical element 317 ("Next Bin") or may end the bin setup procedure by selecting graphical element 318 ("Done").

Figure 8:
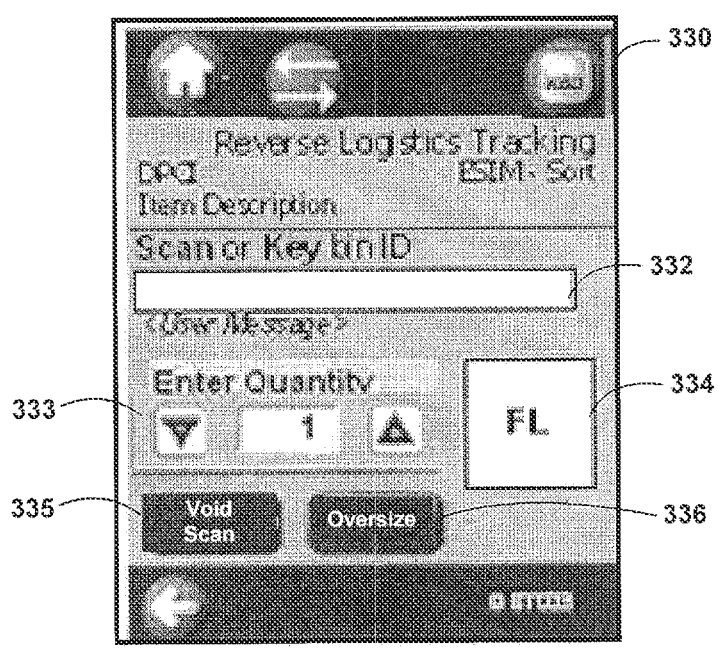
FIG. 8 shows an example screen display that may be presented by a disposition management system in accordance with one or more aspects of the present disclosure.

FIG. 8 shows an example screen display 340 that may be presented by a disposition management system in accordance with one or more aspects of the present disclosure. Screen display 340 may be presented when the user has selected graphical element 306 of FIG. 7A ("Sort ESIM"). Selection of graphical element 306 may permit a user to invoke a sort procedure in which an item is checked-in to a disposition bin. Example screen display 330 includes graphical element 332 (in this case a text entry box) which allows a user to scan a bin label or numerically enter the bin id code of the relevant disposition bin. Graphical elements 333 include up/down arrows and a numerical display which allow the user to increase or decrease the number or quantity of items to be checked into the bin. This permits more than one item to be checked in to a disposition bin in a single sort procedure. A category graphic 334 ("FL" associated with the Flammable category in this example) associated with the scanned bin label may also be displayed as a visual reminder to the user. Graphical element 335 allows the user to void the scan in the event that a mistake was made (e.g., wrong bin scanned, wrong item, etc.). Graphical element 336 allows the user to indicate that the item is oversized and may not fit into the disposition bin. For example, if the user selects "Oversize", they will be led down a separate process that instructs them on wrapping the item and applying a separate bin ID and disposition label. Essentially, the oversize item becomes its own "bin", with a unique Bin ID. For all tracking and pickup and reporting purposes, this item would be considered a bin.

Figure 9A:
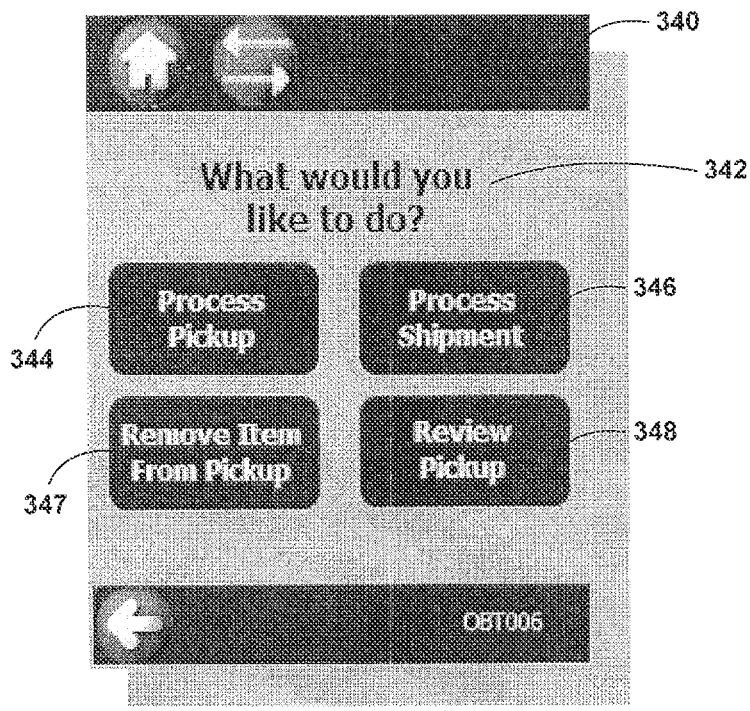
FIGS. 9A and 9B show example screen display that may be presented by a disposition management system in accordance with one or more aspects of the present disclosure.
Figure 9B:
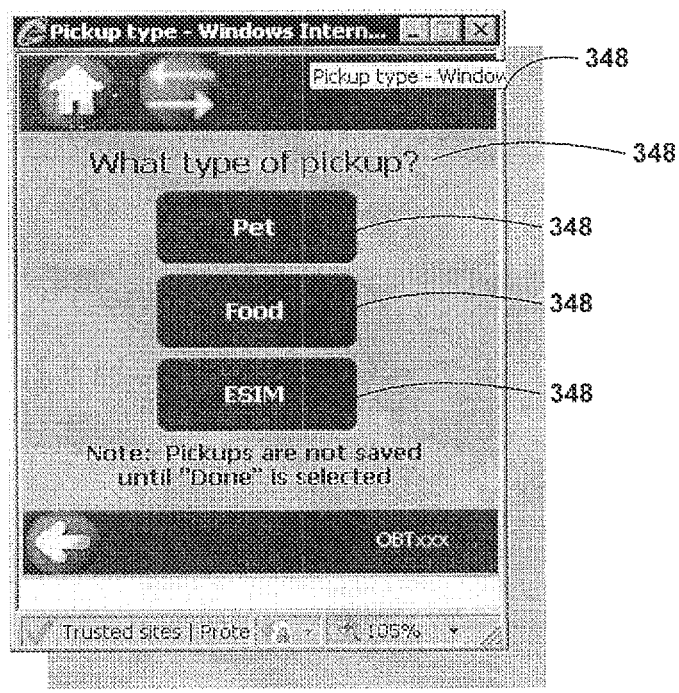

FIGS. 9A and 9B show example screen displays 340, 348, respectively, that may be presented by a disposition management system in accordance with one or more aspects of the present disclosure. Example screen display 340 may be displayed on a check-in/out device 60 or other computing device by disposition management system 80. Example screen display 340 permits a user to process a pick-up by an outbound provider, such as a donation provider or an outbound provider. Text display element 342 presents the question, "What would you like to do?" Graphical elements 344, 346, 347, and 348, for example, allow the user to select "Process Pickup," "Process Shipment," "Remove Item From Pickup," or "Review Pickup," respectively. Disposition management system 80 stores a list of active bins (that is, those bins that should be checked out to the associated outbound provider) associated with each type of pickup in database 82. In response to receipt of the pickup information, disposition management system 80 presents additional screen displays which prompt the user to scan the bin ID (and contents if prompted) for each active bin associated with the current pickup. Disposition management system stores pickup information in database 82 that includes outbound provider identification information, bin label information associated with the disposition bins to be picked up during that type of pickup, and other associated pickup information. If any bins identified as being associated with the particular pickup are not scanned ("checked out"), disposition management system 80 may present additional screen displays prompting for any missed bins that were not previously scanned.

Figure 10:
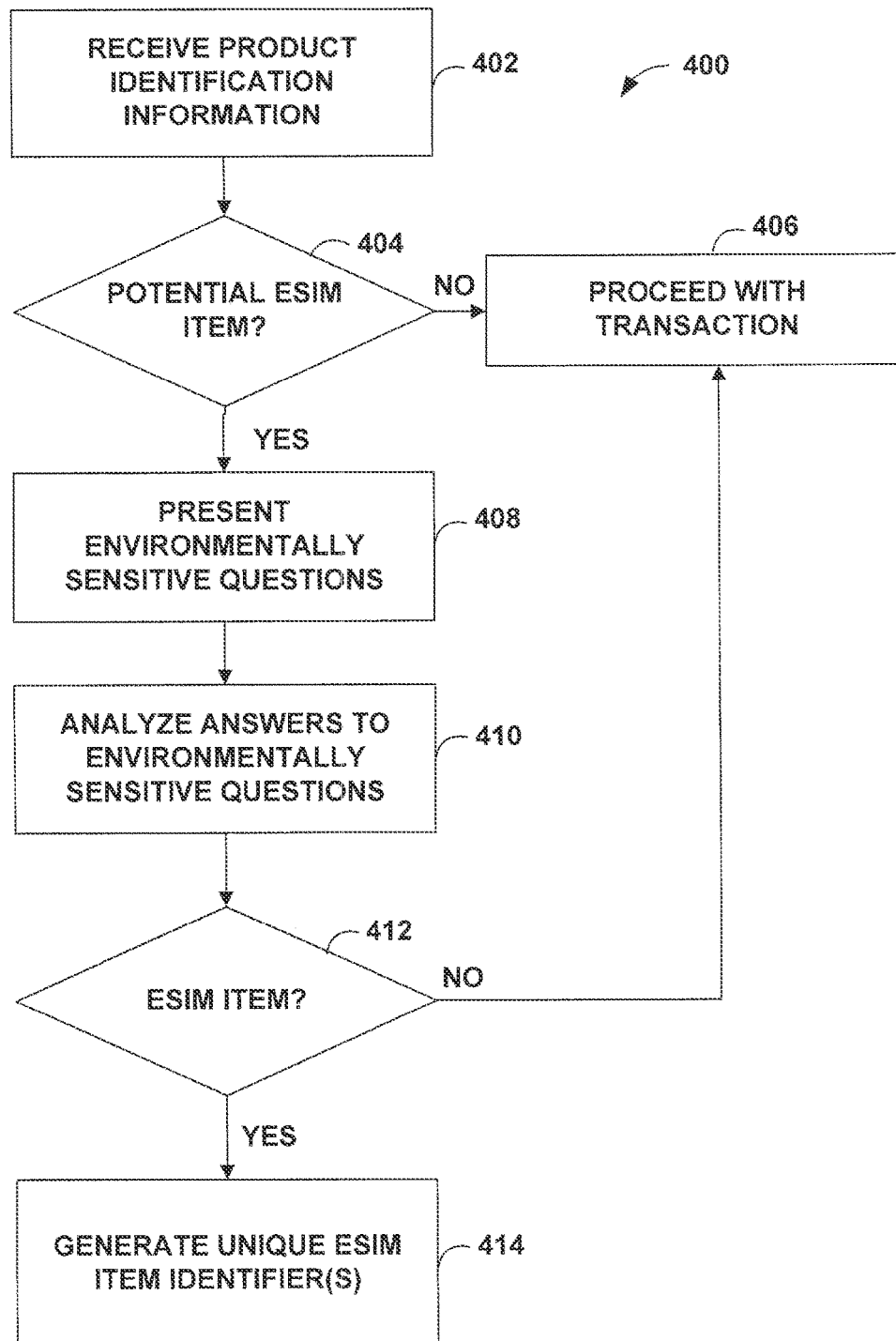
FIG. 10 is a flow chart illustrating an example process that may be executed by a disposition management system in accordance with one or more aspects of the present disclosure.

FIG. 10 is a flow chart illustrating an example process (400) by which a system may execute disposition management techniques in accordance with one or more aspects of the present disclosure. For purposes of illustration only, the example operations are described below within the context of environment 10 and disposition management system 80 of FIG. 1. The software/firmware corresponding to one or more of processes (400), (420), and (440) shown in FIGS. 10-12 may be stored, for example, in disposition module 84.

Process (400) may be executed on one or more processors 86 of disposition management system 80 for those products that, for example, are presented by a customer for return or exchange. Process (400) may also be executed for products that have been spilled, broken, or damaged on the sales floor, or for any other reason which items may enter the ESIM waste stream.

Disposition management system 80 receives the product identification information (402). This information may be received, for example, from POS computing device 20 when the UPC barcode is scanned or the UPC information is manually entered into the system. Disposition management system 80 determines, based on the received product identification information and on information stored in database 82, whether the product is an ESIM item (404). If the product is not an ESIM item (404), disposition management system 80 may hand-off the process to POS system 30 to complete the return or exchange transaction (406). If the product is an ESIM item (404), disposition management system 80 may cause one or more environmentally sensitive questions to be presented at POS computing device 20 (408).

The user may input answers to the environmentally sensitive questions at POS computing device 20 (or using some other computing device such as computing devices 72 or 60 as shown in FIG. 1, which may include a mobile phone, PDA, tablet computer, or the like). Disposition management system 80 receives and analyzes the answers to the one or more environmentally sensitive questions (410) to determine the condition of the ESIM item (412). If the item is not an ESIM item (412) disposition management system 80 may hand-off the process to POS system 30 to complete the return or exchange transaction (406).

Disposition management system 80 may generate a unique item identifier associated with the item (414). Disposition management system may then send the unique item identifier to POS computing device 20 so that a disposition label may be printed as described above with respect to FIG. 1, for example.

Figure 11:
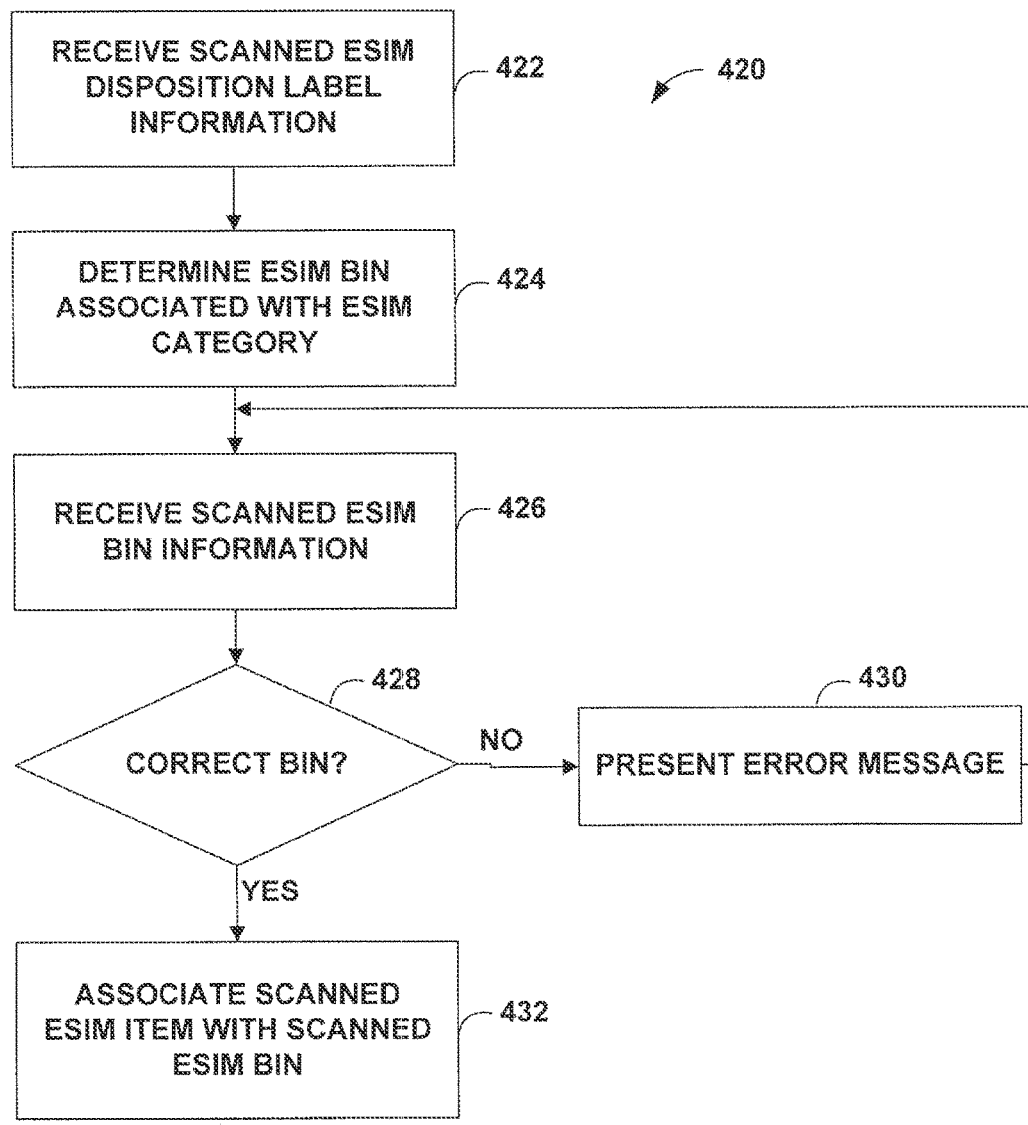
FIG. 11 is a flow chart illustrating another example process that may be executed by a disposition management system in accordance with one or more aspects of the present disclosure.

FIG. 11 is a flow chart illustrating another example process (420) that may be executed by a disposition management system 80 in accordance with one or more aspects of the present disclosure. FIG. 11 illustrates a process (420) by which an item may be checked-in to a disposition bin, such as bins 52A-52N of FIG. 1. A user scans the disposition label, and the information is received by disposition management system 80 (422). Disposition management system 80 determines, based on the scanned disposition label information and on information stored in database 82, the disposition bin associated with that disposition category (424). The user scans the disposition bin label, and the disposition management system 80 receives the scanned disposition bin label information. If the disposition category of the item does not match the category of the scanned disposition bin label (428), disposition management system 80 may present an error message on check-in/our device 60 (430). For example, the error message may indicate that the wrong bin was scanned, and may further indicate the name and/or category of the correct bin.

If the disposition category of the item matches the category of the scanned disposition bin label (428), disposition management system 80 may associate the scanned item with the scanned disposition bin (432) in database 82. This action effectively "checks-in" the item into the appropriate disposition bin.

Figure 12:
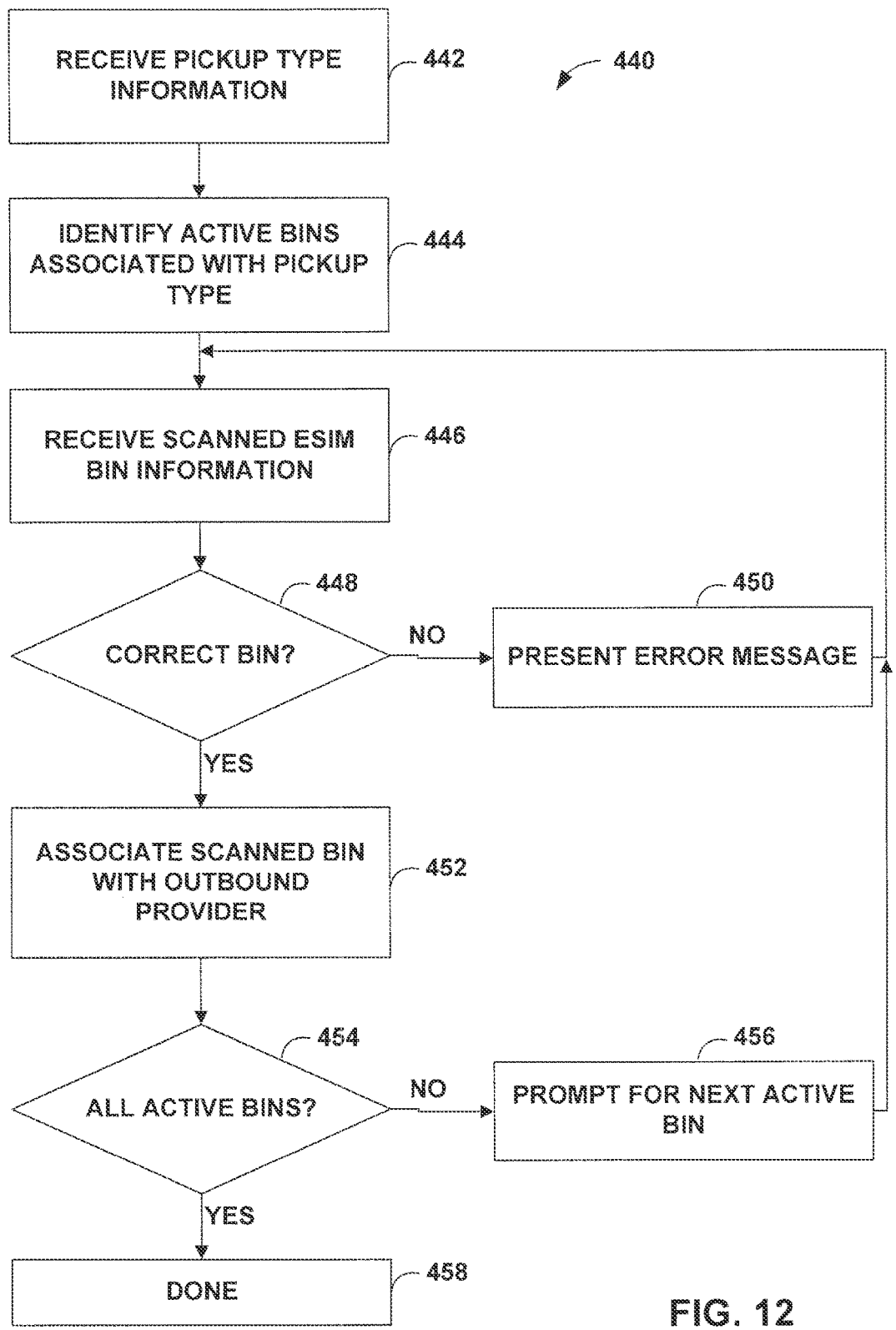
FIG. 12 is a flow chart illustrating another example process that may be executed by a disposition management system in accordance with one or more aspects of the present disclosure.

FIG. 12 is a flow chart illustrating another example process (440) that may be executed by a disposition management system 80 in accordance with one or more aspects of the present disclosure. Disposition management system 80 may execute process (440) when processing a pickup of items to be disposed of or donated, for example. To process a pickup, a user chooses the type of pickup (e.g., ESIM, donation, etc.) on check-in/out device 60. Disposition management system 80 receives the pickup type information (442) and identifies the active bins associated with the pickup (444). Disposition management system may identify the active bins based on the pickup type information, whether or not a disposition bin contains any ESIM items, and the like) stored in database 82. The active bins are identified based on their pickup type—bins that have a disposition label and that have at least one item sorted into it are considered "eligible" for the pickup. Anything with a "Donate" status would be "eligible" for the donate-type pickup.

To "check-out" disposition bins to the outbound provider, a user may scan each disposition bin label or may manually enter the bin identification information. The bin information is received by disposition management system 80 (446). Disposition management system determines whether each scanned bin is an active bin associated with the received pickup type (448). If not, disposition management system 80 may present an error message indicating that an inactive bin has been scanned (450). If the scanned bin is an active bin associated with the received pickup type (448), disposition management system 80 may associate the scanned disposition bin, and/or the items associated with the bin, with the outbound provider (432) in database 82. Disposition management system 80 may also store a date and time stamp corresponding to the pickup. This action effective "checks-out" each bin and/or each of the items to the associated outbound provider.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A system comprising: a point-of-sale (POS) computing device; a plurality of bins sized to receive one or more environmentally sensitive items, each of the plurality of bins associated with at least one of a plurality of disposition categories, each respective bin of the plurality of bins including a respective bin label that includes an electronically-readable bin identifier that uniquely identifies the respective bin; a disposition management system comprising one or more processors, wherein the disposition management system is configured to communicate with the POS computing device using a computer network; and a check-in/check-out device, wherein the POS computing device is configured to scan product identification information associated with an item being returned to a retailer, the product identification information being a Universal Product Code (UPC) bar code included in the item, the UPC bar code indicating a product to which the UPC bar code is attached, wherein the disposition management system is configured to: receive, from the POS computing device, the product identification information associated with the item, in response to receiving the product identification information associated with the item from the POS computing device, determine, based on the received product identification information, that the item is an environmentally sensitive item, and based on the item being an environmentally sensitive item, cause a user interface of the POS computing device to present one or more questions, wherein the questions ask for information regarding a condition of the environmentally sensitive item, wherein the POS computing device is further configured to: present the questions on the user interface and receive user input indicative of answers to the questions; wherein the disposition management system is further configured to associate the environmentally sensitive item with a disposition category in the plurality of disposition categories based on the received product identification information and the answers to the questions, wherein the POS computing device is further configured to generate a disposition label that includes a disposition identifier that uniquely identifies the environmentally sensitive item such that the environmentally sensitive item is individually trackable through a disposition management chain until final disposition, the disposition label also indicating the disposition category associated with the environmentally sensitive item, wherein the disposition identifier is electronically-readable, and wherein the disposition management system is further configured to: in response to a check-in selection input by a first user, receive, from the check-in/check-out device, the disposition identifier and a bin identifier included in a bin label of a selected bin of the plurality of bins; determine, based on the received disposition identifier and the received bin identifier, whether the selected bin is appropriate for the environmentally sensitive item; and based on the selected bin being appropriate for the environmentally sensitive item, associate the received disposition identifier with the received bin identifier.

2. The system of claim 1, wherein the plurality of disposition categories include one or more of a corrosive acidic category, a corrosive basic category, a flammable category, an oxidizer category, a state regulated category, a problem item/recall category, an electronics recycling category, a light bulb recycling category, a pharmaceuticals category, a battery category, or a liquor category.

3. The system of claim 1, wherein the disposition identifier includes at least one of a barcode, a QR code, or an identification number.

4. The system of claim 1, wherein the disposition management system is further configured to generate reports concerning one or more environmentally sensitive items.

5. The system of claim 1, the check-in/check-out device further configured to receive user input indicative of a pickup type, the pickup type including one of a hazardous waste pickup or a donation pickup.

6. The system of claim 1, wherein:
the environmentally sensitive item is a first environmentally sensitive item,
the disposition management system further is configured to:
in response to a second check-in selection user input, receive, from the check-in/check-out device, a disposition identifier of a second environmentally sensitive item and a second bin identifier, wherein the second bin identifier is included in a bin label of a second selected bin of the plurality of bins, and
determine, based on the disposition identifier of the second environmentally sensitive item and the second bin identifier, whether the second selected bin is appropriate for the second environmentally sensitive item; and
the check-in/check-out device is configured to display an error message based on the selected bin not being appropriate for the second environmentally sensitive item.

7. The system of claim 1, wherein the disposition management system is configured to:
receive, in response to the check-in/check-out device receiving user input selecting a pickup event, the bin identifier included in the bin label of the selected bin; and
associate the bin identifier with an outbound provider.

8. The system of claim 1, wherein
the environmentally sensitive item is a first environmentally sensitive item and the bin identifier is a first bin identifier,
the disposition management system further is configured to:
in response to a second check-in selection user input, receive, from the check-in/check-out device, a disposition identifier of a second environmentally sensitive item and a second bin identifier that is different than the first bin identifier, wherein the second bin identifier is included in a bin label of a second selected bin of the plurality of bins, and determine, based on the disposition identifier of the second environmentally sensitive item and the second bin identifier, whether the second selected bin is appropriate for the second environmentally sensitive item; and based on the second selected bin being appropriate for the second environmentally sensitive item, associate the disposition identifier of the second environmentally sensitive item with the second bin identifier.

* * * * *